(12) United States Patent
Leyden et al.

(10) Patent No.: US 7,540,451 B2
(45) Date of Patent: Jun. 2, 2009

(54) SYSTEM FOR SECURING A CABLE TO A PORTABLE ARTICLE

(75) Inventors: Roger Leyden, Inverness, IL (US); Terrance Surma, Carol Stream, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 136 days.

(21) Appl. No.: 11/515,575

(22) Filed: Sep. 5, 2006

(65) Prior Publication Data

US 2008/0054127 A1    Mar. 6, 2008

(51) Int. Cl.
*F16L 5/00* (2006.01)
(52) U.S. Cl. .......................................... 248/56; 248/71
(58) Field of Classification Search ............. 248/56, 248/65, 71, 73
See application file for complete search history.

(56) References Cited

U.S. PATENT DOCUMENTS

| | | |
|---|---|---|
| 5,117,661 A | 6/1992 | Carl et al. |
| D337,040 S | 7/1993 | Carl et al. |
| D337,041 S | 7/1993 | Carl |
| D347,987 S | 6/1994 | Carl et al. |
| 5,327,752 A | 7/1994 | Myers et al. |
| 5,381,685 A | 1/1995 | Carl et al. |
| 5,493,878 A | 2/1996 | Murray, Jr. et al. |
| 5,502,989 A | 4/1996 | Murray, Jr. et al. |
| 5,787,738 A | 8/1998 | Brandt et al. |
| 5,787,739 A | 8/1998 | Derman |
| 5,836,183 A | 11/1998 | Derman |
| 5,884,508 A | 3/1999 | Dwight |
| 5,987,937 A | 11/1999 | Lee |
| 6,000,251 A | 12/1999 | Murray, Jr. et al. |
| 6,000,252 A | 12/1999 | Murray, Jr. et al. |
| 6,006,557 A | 12/1999 | Carl et al. |
| 6,038,891 A | 3/2000 | Zeren et al. |
| 6,081,974 A | 7/2000 | McDaid |
| 6,112,561 A | 9/2000 | Carl |
| 6,112,562 A | 9/2000 | Murray, Jr. et al. |
| 6,115,088 A | 9/2000 | Zhang et al. |
| 6,173,591 B1 | 1/2001 | Derman |
| 6,212,918 B1 | 4/2001 | Kravtin |
| 6,295,847 B1 | 10/2001 | Zeren |
| 6,301,940 B1 | 10/2001 | Derman et al. |
| 6,317,936 B1 | 11/2001 | McDaid et al. |
| 6,401,504 B1 | 6/2002 | Derman et al. |
| 6,513,350 B1 | 2/2003 | Hurd et al. |

(Continued)

*Primary Examiner*—Amy J. Sterling
(74) *Attorney, Agent, or Firm*—Wood, Phillips, Katz, Clark & Mortimer (57) ABSTRACT

The combination of a portable component, a cable attaching assembly, and a cable. The component has a wall with oppositely facing inside and outside surfaces and an opening. The cable attaching assembly has an anchor element with first and second transverse legs. The first leg is directed into the opening in a first direction into a first position with the anchor element in a first orientation. The anchor element is changed from the first orientation, with the anchor element in the first position, to place the anchor element in an operative position, wherein the first leg is situated in confronting relationship with the inside of the wall. The cable is connected to the anchor element so that the anchor element cannot be reoriented from the operative position to allow the anchor element to be withdrawn from the opening. The anchor element is the only component required in the opening.

22 Claims, 5 Drawing Sheets

U.S. PATENT DOCUMENTS

| | | |
|---|---|---|
| 6,553,794 B1 | 4/2003 | Murray, Jr. et al. |
| 6,662,602 B1 | 12/2003 | Carl |
| 6,708,535 B1 | 3/2004 | Sanders |
| 6,735,990 B1 | 5/2004 | Murray, Jr. et al. |
| 6,742,366 B1 | 6/2004 | Lai |
| 6,758,069 B2 | 7/2004 | Derman |
| 7,013,685 B2 | 3/2006 | Francke |
| 2004/0040350 A1 | 3/2004 | Derman |
| 2004/0089770 A1* | 5/2004 | Akizuki .................. 248/71 |
| 2004/0206138 A1 | 10/2004 | Murray, Jr. et al. |
| 2005/0028571 A1 | 2/2005 | Merrem et al. |
| 2005/0150262 A1 | 7/2005 | Murray, Jr. et al. |
| 2005/0211853 A1* | 9/2005 | Whorton .................. 248/71 |
| 2006/0081021 A1 | 4/2006 | Merrem et al. |
| 2006/0175473 A1* | 8/2006 | Takeuchi .................. 248/71 |

* cited by examiner

SYSTEM FOR SECURING A CABLE TO A PORTABLE ARTICLE

BACKGROUND OF THE INVENTION

1. Field of the Invention

This invention relates to security systems and, more particularly, to a system for securing a cable to a portable article to confine movement of the portable article to within a prescribed area.

2. Background Art

Theft of portable articles continues to account for significant losses in many different industries. This is particularly a problem in the electronics industry and in stores at which large numbers of different articles/components are displayed for interactive handling by prospective purchasers thereof. This problem is aggravated by the advent of "mega" electronic stores that display a multitude of electronic articles/components in vast showroom spaces.

In large showrooms, there are a number of different options available to store operators to control theft. The first option is to lock small articles/components in cases to which there is restricted access. This method has a number of drawbacks, however.

First of all, there is an inherent inconvenience in having to have employees access locked cabinets with keys. Determining who should have keys and how access thereto should be gained and monitored is in itself a problem.

Further, prospective purchasers of electronics have now become accustomed to having the opportunity to pick up and operate many different types of small electronic articles/components. Aside from the inconvenience associated with making many products available to a prospective purchaser, each employee is burdened with the task of keeping track of all articles/components as they are removed and made available to the prospective purchaser.

Another alternative security method relies upon the use of surveillance cameras. In the absence of having several individuals monitor a space, this method is relatively ineffective. Given the ever increasing size of showrooms and proliferation of different types and brands of electronic equipment, effective monitoring through this method may be a monumental task.

A third security method involves providing some sort of security system in association with each article/component. In one form, tags are used on each article/component to be sensed by a scanner near the exit of a facility in which the particular products are displayed and sold. Unfortunately, by the time security personnel are alerted to a possible theft, the person absconding with an article(s) may have already distanced themselves to the point that they cannot be apprehended.

Another method in this last category involves tethering the individual articles/components through electrical and/or mechanical systems. The assignee herein has devised numerous different systems for this purpose. Systems range from relatively simple types, as those using a mechanical cable, to those using sophisticated electronics for purposes of monitoring many articles/components and identifying a system breach.

In every instance, the analysis of feasibility of investing in a security system must take into account the anticipated losses in the absence of the use thereof. If cost were not an issue, virtually every valuable portable article/component would have some sort of associated security system.

The current problems contended with in the industry can be demonstrated with respect to computer components. For example, computer monitors and keyboards of different type and brand are offered in large numbers in office supply and electronic stores. A computer keyboard, while being a relatively inexpensive item, is an inviting target to thieves in the absence of there being some sort of associated security system.

In recent years, a generic system has been devised for facilitating connection of cables to this type of component. Square or rectangular slots of relatively small dimension (on the order of 7 millimeters) have been formed in components at the time of their manufacture or by the purveyor thereof to accept a structure for securing a mechanical cable thereto. A multitude of different systems have been devised which utilize a cable accepting assembly. The cable accepting assembly is designed to project through the opening in a component, to be locked therewithin. By directing a cable through the cable accepting assembly, and appropriately securing the cable therewith, the associated component is confined by the cable within a prescribed area, generally as dictated by the length of the cable.

Designers of these cable accepting assemblies have a number of design criteria. First of all, the assemblies should be inexpensive to justify their use. Secondly, assembly thereof should be simple so that they will be consistently used and consistently set up by those given this responsibility. Third, the system should be effective in terms of preventing theft.

One exemplarly system of this type is shown in U.S. Pat. No. 5,787,739, to Derman. Derman uses multiple plates, each with an offset tang. The plates are individually inserted to place the tangs behind an inside surface on a wall through which the accommodating opening is formed. The plates are installed by using a predetermined combination of translational and pivoting movement. Once the plates are installed, the separate tangs cooperatively bear on the inside surface to prevent withdrawal thereof. By then directing a saddle around the plates and directing a cable through the plates and saddle, the elements cooperate with each other and the particular component being secured to preclude manipulation of the plates in a manner that would allow their separation from the component.

While this type of system is effective, the manipulation of multiple plates, particularly by reason of their small size, is a potentially difficult operation, demanding a good degree of dexterity for the individual delegated this task. The degree of difficulty may ultimately be such that the individual foregoes set-up of the security system on every component intended to be secured.

In spite of the multitude of different designs of these cable accepting assemblies, the industry continues to seek out new designs that meet at least all of the above three criteria.

SUMMARY OF THE INVENTION

In one form, the invention is directed to the combination of a portable component, a cable attaching assembly, and a cable. The portable component has a wall with oppositely facing inside and outside surfaces and an opening through the wall. The cable attaching assembly has an anchor element with first and second transverse legs having a fixed angular relationship. The first leg is capable of being directed into the opening substantially along a first line in a first direction into a first position with the anchor element in a first orientation. The anchor element is capable of being reoriented relative to the portable article from the first orientation, with the anchor element in the first position, to thereby place the anchor element in an operative position wherein the first leg is situated in a confronting relationship with the inside surface of the wall on the portable article, wherein the first leg abuts to the inside surface to prevent separation of the anchor element by movement thereof in the operative position substantially along the first line opposite to the first direction. The cable is connected to the anchor element so that the anchor element cannot be reoriented from the operative position in a manner that allows the anchor element to be withdrawn from the opening through the wall of the portable component. The anchor element is the only component on the cable attaching assembly directed into the opening to maintain the first leg in the opening.

In one form, the anchor element has a single piece that defines the first and second legs.

The anchor element may be formed by a single piece of metal that is bent to define the first and second legs.

In one form, the cable attaching assembly further includes a cover assembly. The cable is capable of cooperating with the anchor element and cover assembly in a manner that a region of the wall of the portable component is captive between a part of the cover assembly and first leg. The part of the cover assembly and first leg cooperate with the wall and the portable component with the cover assembly in an operative state to prevent separation of the anchor element by reorientation thereof from the operative position in a manner that would allow the anchor element to be withdrawn from the opening through the wall of the portable component.

In one form, there are alignable openings in the second leg and cover assembly through which the cable extends to maintain the cover assembly in the operative state.

In one form, the cover assembly has spaced walls between which the second leg resides with the cover assembly in the operative state. There is an opening in each of the spaced walls through which the cable extends.

The cover assembly may fully surround the second leg.

In one form, the cover assembly has a single piece that defines the spaced walls.

In one form, the cable has a free end that is extended through the anchor element in a second direction and the cable attaching assembly further includes a lock assembly that is releasably attached at the free end of the cable. The lock assembly precludes passage of the free end of the cable through the anchor element by movement thereof in a direction opposite to the second direction.

In one form, the lock assembly has a housing and a locking assembly that is operable to selectively: (a) maintain the housing on the cable with the locking assembly in a first state; and (b) allow separation of the housing from the cable with the locking assembly in a second state.

The locking assembly is changeable between the first and second states through one of: (a) a key operated mechanism; and (b) a combination operated mechanism.

In one form, the cover assembly has a housing with a flat surface that faces the first leg with the anchoring element in the operative position and the cover assembly in the operative state. A region of the wall is captive between the flat surface and first leg in a manner that prevents separation of the anchor element by reorientation thereof from the operative position as would allow the anchor element to be withdrawn from the opening through the wall of the portable component.

In one form, the opening is one of: (a) square; and (b) rectangular with transverse dimensions that are not greater than 10 millimeters.

In one form, the portable component is an electronic component.

The combination may further include a support to which the cable is secured to confine movement of the portable component relative to the support.

In one form, the opening in the wall is round.

In one form, the cover assembly has a housing with a U-shaped portion with first and second spaced legs between which the anchor element resides and an outturned flange on at least one of the spaced legs.

In one form, there are oppositely projecting outturned flanges, one each on the first and second spaced legs.

In one form, the U-shaped portion and at least one outturned flange are defined by a single piece of formed metal.

In one form, the cable has a metal core and non-metal sheath surrounding the metal core.

DETAILED DESCRIPTION OF THE DRAWINGS

Figure 1:
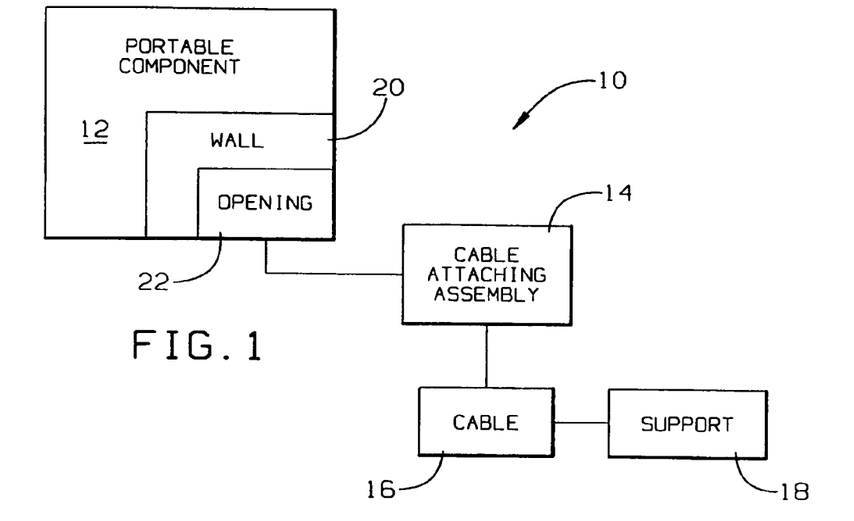
FIG. 1 is a schematic representation of a system for securing a portable component relative to a support, according to the present invention, and including a cable attaching assembly that cooperates with the portable component and a cable that is connected to the support.

In FIG. 1, a system, according to the present invention, is shown at 10, including a portable article/component 12 (hereinafter a "component") with which a cable attaching assembly 14 is associated to maintain a cable 16 attached to the component 12. The cable 16 is in turn connected to a support 18 relative to which the portable component 12 is confined by the cable 16, as dictated by the length of the cable 16.

The portable component 12 is not limited in terms of its nature, size, or configuration. The cable attaching assembly 14 is useable with the portable component 12 so long as the portable component 12 has a wall 20 through which an opening 22 is either pre-formed or can be formed to cooperate with the cable attaching assembly 14.

One exemplary form of the cable attaching assembly 14 is shown in FIGS. 2-10. The cable attaching assembly 14 is an anchor element 24 having first and second transverse legs 26, 28, respectively, in a fixed angular relationship. In this embodiment, the lengths of the legs 26, 28 are substantially orthogonal to each other, though this is not a requirement. The outer surface 29 of the anchor element 24 is curved at the juncture of the legs 26, 28, with the leg 26 tapering in thickness therefrom to a relatively thin edge 30 at the free end thereof.

Figure 2:
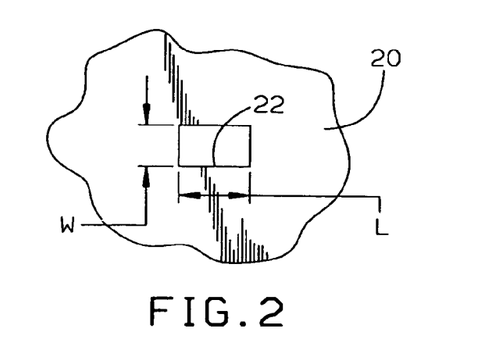
FIG. 2 is a fragmentary, elevation view of an exemplary opening in a wall on the portable component with which the cable attaching assembly cooperates.
Figure 3:
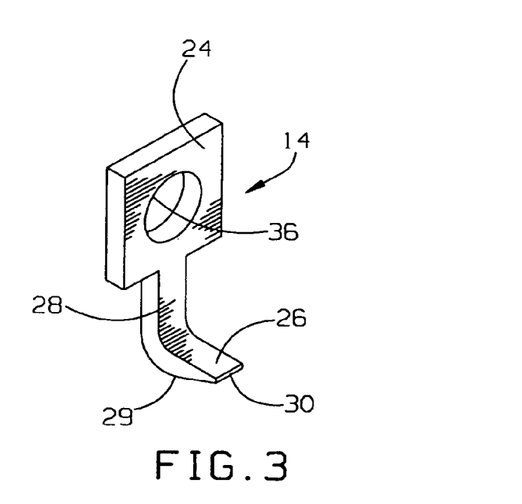
FIG. 3 is a perspective view of one form of anchor element on the cable attaching assembly which extends through the opening in the portable component wall and through which the cable passes to effect attachment thereof.
Figure 4:
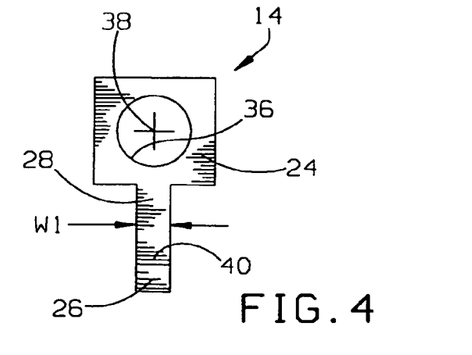
FIG. 4 is an elevation view of the anchor element in FIG. 3.

As noted above, the cable attaching assembly 14 is designed to cooperate with the portable component 12, regardless of its nature. As but one example, the portable component 12 may be an electronic component, such as a computer keyboard or monitor with the wall 20 having the opening 22 pre-formed therein or formed after manufacture. The opening 22 is shown as squared and, more particularly, rectangular, though this is not required. Components in the computer industry are being made with pre-formed openings 22 having length and width dimensions L, W, neither of which exceeds 10 millimeters, to accommodate many different types of cable attaching assemblies.

Figures 5, 6, 7, 8, 9:
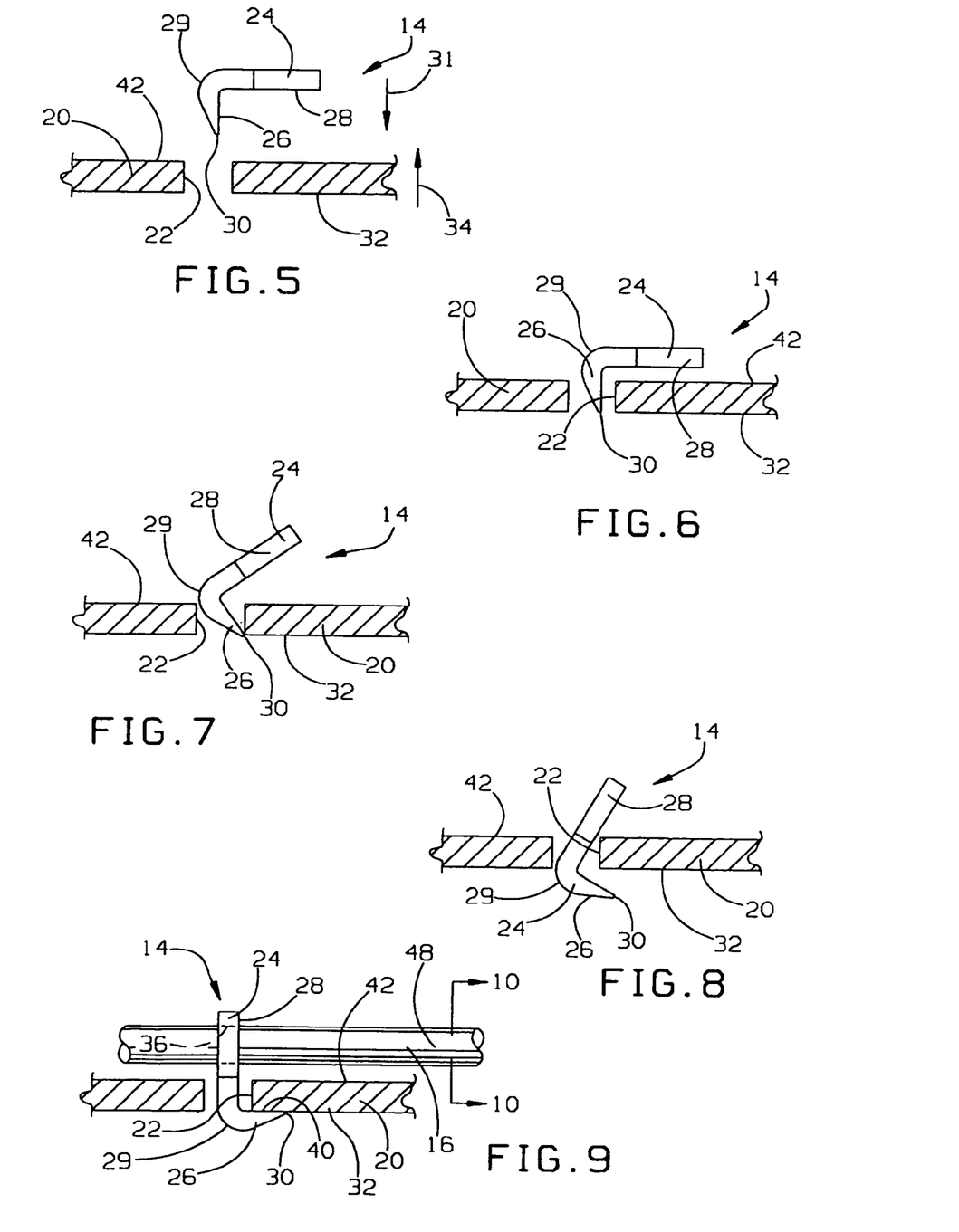
FIG. 5 is a reduced, fragmentary, cross-sectional view of a region around the opening in the wall of the component through which the anchor element in FIGS. 3 and 4 is directed and with the anchor element shown in a first orientation preparatory to installation.
FIG. 6 is a view as in FIG. 5 wherein a leg on the anchor element is directed into the opening.
FIG. 7 is a view as in FIG. 6 wherein the anchor element is angularly orientated towards an operative position.
FIG. 8 is a view as in FIG. 7 wherein the anchor element is further angularly oriented towards the operative position.
FIG. 9 is a view as in FIG. 8 wherein the anchor element is in its operative position and a cable is directed therethrough.

To assemble the anchor element 24, the anchor element 24 is placed in a first orientation, as shown in FIG. 5 in relationship to a region of the wall 20 at which the opening 22 is formed. In the first orientation, the length of the first leg 26 is aligned to be directed through the opening 22 by movement along a first line, in a first direction, as indicated by the arrow 31, to a first position shown in FIG. 6. In the first position of FIG. 6, the first leg 26 resides within the opening 22 and the anchor element 24 is allowed to be angularly reoriented therefrom to the FIG. 7 position by either a pivoting motion or a combination of pivoting and translation, as dictated by the relative dimensions of the legs 26, 28 and opening 22. The curved surface 29 can be guided against the wall 20 at the opening 22 to facilitate this repositioning. From the FIG. 7 position, the anchor element 24 is reoriented to the FIG. 8 position and ultimately to the FIG. 9, operative position/state, wherein the first leg 26 is situated in confronting relationship with an inside surface 32 on the wall 20 such that the first leg 26 abuts to the inside surface 32 to prevent separation of the anchor element 24 from the wall 20 by movement thereof in the operative position/state along a line, as indicated by the arrow 34, opposite to the first direction indicated by the arrow 31. In other words, the anchor element 24 cannot be withdrawn from the opening 22 other than by effecting reorientation thereof by substantially reversing the steps shown in FIGS. 7 and 8.

Once the anchor element 24 is in the operative position/state of FIG. 9, the cable 16 can be directed through an opening 36 through the second leg 28. The central axis 38 of the opening 36 is spaced from a surface 40 on the leg 26 so that with the cable 16 directed through the opening 36 in the second leg 28, the cable 16, wall 20, and anchor element 24 cooperate so as to preclude reorientation of the anchor element 24 from the operative position in FIG. 9 as would allow the anchor element 24 to be withdrawn from the opening 22. More particularly, the thickness of the wall 20 becomes either tightly, or as shown loosely, captive between the cable 16 and leg surface 40. Attempted pivoting of the anchor element 24 from the operative position of FIG. 9 is confined by the cable 16 that abuts to the outside surface 42 of the wall 20 to thereby confine angular reorientation of the anchor element 24.

Figures 10, 11, 12, 13, 14:
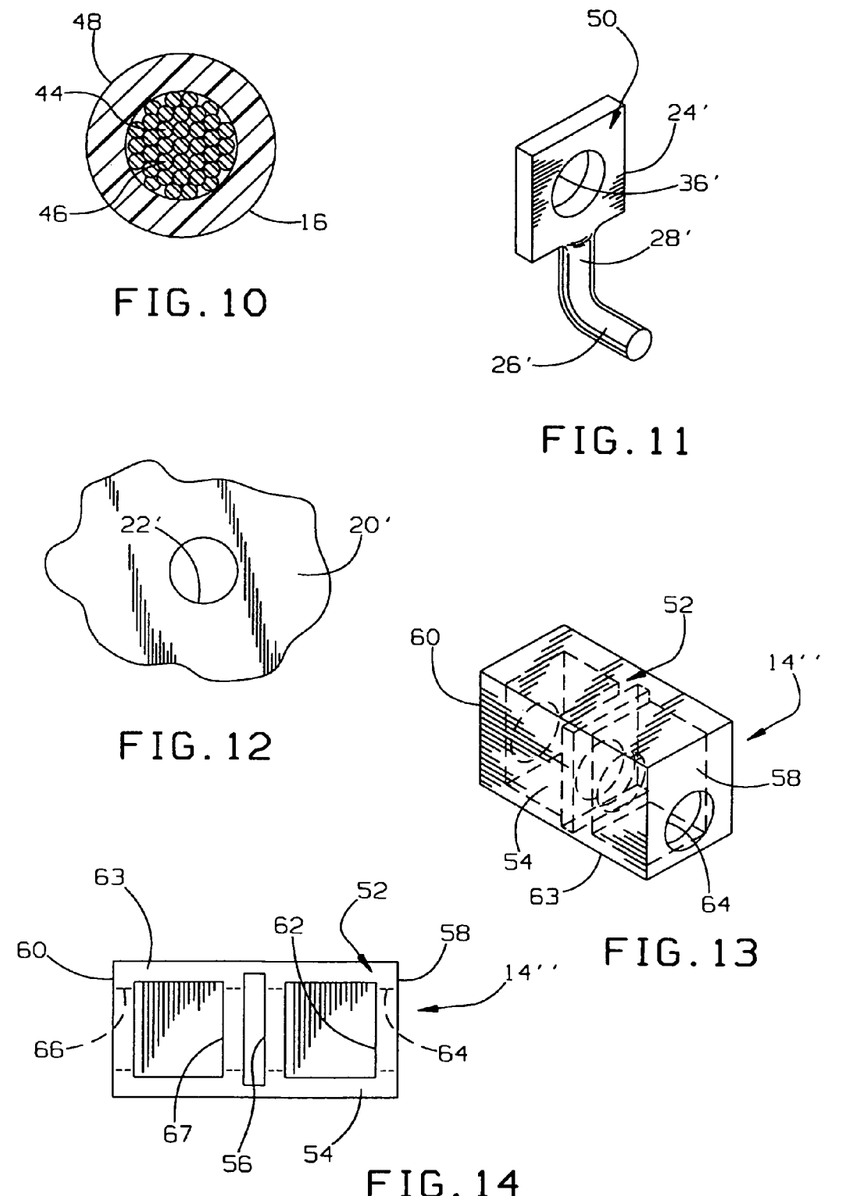
FIG. 10 is an enlarged, cross-sectional view of the cable taken along line 10-10 of FIG. 9.
FIG. 11 is a view as in FIG. 3 of a modified form of anchor element.
FIG. 12 is a view as in FIG. 2 of a modified form of opening in a portable component to accommodate the anchor element in FIG. 11.
FIG. 13 is a perspective view of a housing usable as part of a modified form of cable attaching assembly, according to the invention.
FIG. 14 is a bottom view of the housing in FIG. 13.

As shown particularly in FIG. 10, the cable 16 is constructed so that it is not readily severed or bent/deformed in a manner that would allow reorientation of the anchor element 24 from the operative position, as to allow separation thereof from the wall 20. As one example, the cable 16 may have a metal core 44 that is either solid or made from braided filaments 46. The core 44 in turn is surrounded by preferably a non-metal sheath 48.

With this embodiment, the anchor element 24 defines the cable attaching assembly 14, and only the anchor element 24 and cable 16 are required to connect the cable 16 to the portable component 12. The installer need only carry out the steps shown in FIGS. 5-9 and thereafter direct the cable 16 through the opening 36 in the second leg 28 to cause the cable 16, anchor element 24, and wall 22 to cooperate to prevent reorientation of the anchor element 24 from the operative position of FIG. 9 to allow its separation thereof from the wall 20.

The anchor element 24 can be made in virtually a limitless number of different forms and by virtually a limitless number of different methods. The form shown lends itself to formation using a single struck piece of flat metal that can be bent to form the first leg 26. Alternatively, the shape shown could be molded or made in multiple parts that are secured together. A non-metal material, such as plastic or a composite, could be used to form part, or all, of the anchor element 24.

An alternative form of the anchor element defining the cable attaching assembly 14' is shown at 24' in FIG. 11. At least the first leg 26' and potentially part of the second leg 28' may be made from round stock material. The round material may be compressed/squeezed to produce an enlargement at 50 having an area sufficient to form an opening 36' to accept the cable 16.

With the anchor element 24' constructed as in FIG. 11, the accommodating opening 22' through the wall 20', shown in FIG. 12, may have a rounded shape. While the anchor element 24' may be simply constructed, the leg 28' is capable of turning within the opening 22'. In some applications, this may be a problem. On the other hand, with the anchor element 24, the width W1 (FIG. 4) of the leg portion within the opening 22 may be only slightly less than the width W (FIG. 2) of the opening 22 so that the anchor element 24 is keyed against turning around the portion of the second leg 28 that resides within the opening 22. The anchor element 24 is also useable with a round opening as shown at 22', or other shape opening, but might be turned therewithin, which may not be desirable.

Figures 15, 16, 17, 18:
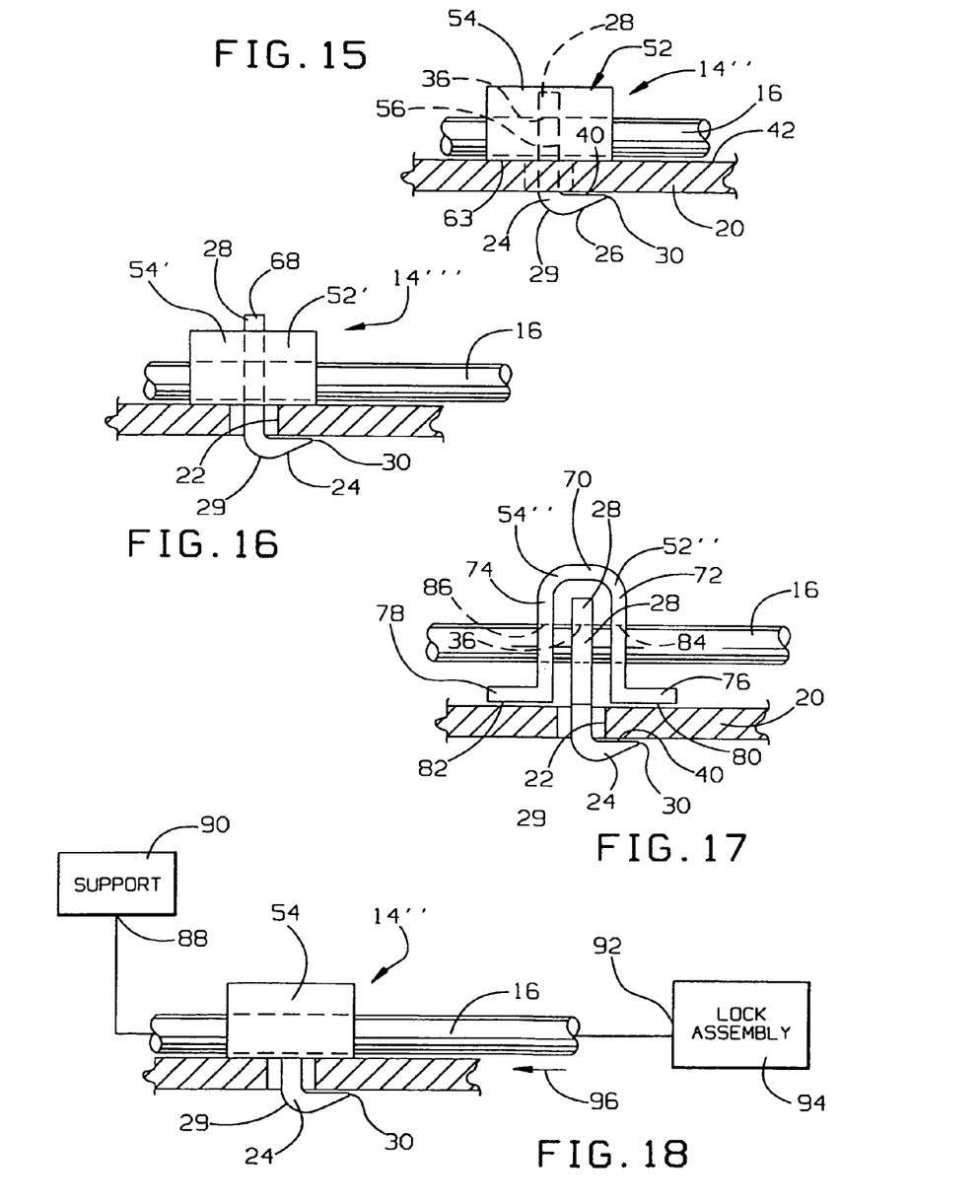
FIG. 15 is a view as in FIG. 9 wherein the anchor element is in its operative position and the cover assembly of FIGS. 13 and 14 is in an operative state with the cable passing therethrough.
FIG. 16 is a view corresponding to that in FIG. 15 with a modified form of housing wherein a leg on the anchor element projects through the housing.
FIG. 17 is a view as in FIG. 16 of a further modified form of cover assembly.
FIG. 18 is a view as in FIG. 15 wherein the cable ends are shown connected to a support and a lock assembly, with the latter preventing withdrawal of the cable from the housing.

A further modified form of cable attaching assembly, according to the present invention, is shown at 14''' in FIGS. 13-15. The cable attaching assembly 14''' additionally has a cover assembly 52 in the form of a housing 54 that is placed over the second leg 28 of the anchor element 24 with the anchor element 24 in the operative position of FIG. 15. The housing 54 has a receptacle 56 for the second leg 28 mid-way between spaced walls/wall parts 58, 60. Cavities 61, 62 may be formed to reduce material requirements and the weight of the housing 54. The housing 54 has a flat surface 63 that abuts, or is in close proximity, to the outside surface 42 of the wall 20 with the leg 28 in the receptacle 56. The walls/wall parts 58, 60 can be made as one piece. In the form shown, the entire housing 54 is formed as a single piece that may be made from plastic, metal, a composite, or any other durable material.

With the cover assembly 52 in the operative state of FIG. 15 with the second leg 28 in the receptacle 56, the cable 16 can be directed through aligned bores 64, 66, respectively in the walls/wall parts 58, 60, and the opening 36 through the anchor element 24. The bores 64, 66 can be concentric to be formed in a single drilling operation.

The housing 54 is constructed so that in the operative position of FIG. 15, the wall 20 is captive between the surface 63 and the surface 40 on the leg 26. This design affords a more positive captive holding of the wall 20 that does not depend as greatly upon the rigidity of the cable 16 as do the embodiments described above. So long as the cable 16 is not severed, the wall 20 is positively held between the housing surface 63 and the leg surface 40, with the former extending fully around the leg 28 and defining a stabilizing surface 63 with a substantial contact footprint. The anchor element 24 is thus precluded from being reoriented from its operative position to allow separation thereof from the wall 20.

In a further modified form of cable attaching assembly, shown at 14''' in FIG. 16, a cover assembly 52', corresponding to the cover assembly 52 shown in FIGS. 13-15, has a dimension so that the leg 28 on the anchor element 24 projects fully through the housing 54' so that a projecting portion 68 can be grasped to facilitate relative positioning of the anchor element 24 and housing 54' to facilitate direction of the cable 16 therethrough. The cable attaching assembly 14''' otherwise operates in the same manner as the cable attaching assembly 14'''.

In FIG. 17, a further variation is shown wherein the cover assembly 52'' does not fully surround the anchor element leg 28. Instead, the cover assembly 52'' has a housing 54'' with a U-shaped portion 70 with spaced first and second legs 72, 74 between which the anchor element leg 28 resides with the cover assembly 52'' in the operative state of FIG. 17. The legs 72, 74 may be spaced, as shown, or may closely captively engage the anchor element leg 28.

Oppositely projecting, outturned flanges 76, 78 are provided, one each on the legs 72, 74, and define flat surfaces 80, 82, respectively, that face the leg surface 40 to produce a captive arrangement for the region of the wall 20 around the opening 22. The cable 16 is directed through openings 84, 86 in the legs 72, 74, respectively, and through the opening 36 through the leg 28 on the anchor element 24.

As shown in FIG. 18 with the exemplary cable attaching assembly 14''', the end, or an intermediate portion 88 of the cable 16 directed through the housing 54, may be secured to any suitable support 90 by any means known to those skilled in the art.

The opposite cable end, or an immediate portion 92, may have a lock assembly 94, either permanently or releasably held thereon, to prevent withdrawal of the cable end 92 from the housing 54 by translation thereof in the direction of the arrow 96, i.e. opposite to the assembly direction of movement for the cable 16.

Figure 19:
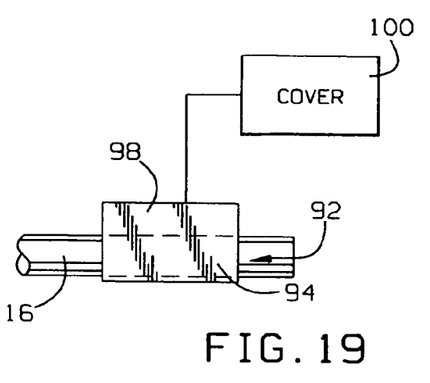
FIG. 19 is fragmentary, elevation view of one form of lock assembly, shown schematically in FIG. 18, and including an enlargement that is crimped on the cable.

In one of its simplest states, as shown FIG. 19, the locking assembly 94 may consist of an enlargement 98 that is crimped to the cable end 92, or otherwise secured thereto, as by fasteners, welding, etc. The enlargement 98 is such it will not pass through the openings in the housing 54 or anchor element 24 to allow disassembly thereof. The enlargement 98 may be crimped to the cable 16 ahead of time, whereupon the cable end 88 must be directed through the housing 54 and anchor element 24 in the direction of the arrow 96 in FIG. 18, and thereafter secured to the support 90. Alternatively, the end 92 can be directed through the housing 54 oppositely to the direction of the arrow 96, to be exposed, after which it is fit with the enlargement 94.

A protective cover 100 may be applied over the enlargement 98. The cover 100 may be made from a soft material to avoid presentation of sharp edges that may damage surrounding components, or other equipment, or injure the handlers thereof.

Figure 20:
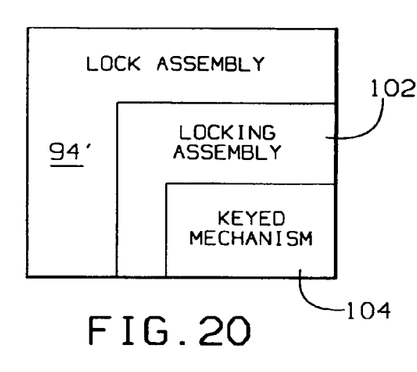
FIG. 20 is a schematic representation of a modified form of lock assembly using a keyed mechanism to allow selective attachment and separation of the lock assembly from the cable end.
Figure 21:
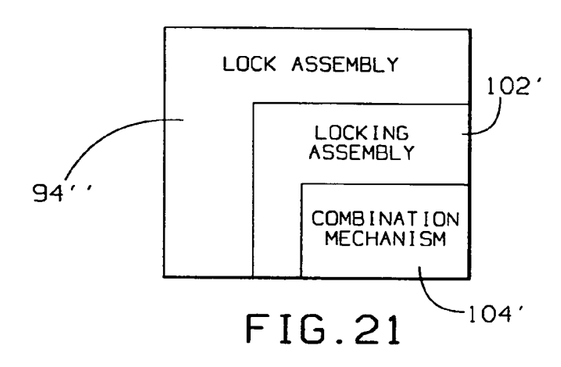
FIG. 21 is a view as in FIG. 20 of a modified form of lock assembly operable through a combination mechanism.

As an alternative to using the enlargement 94, releasable lock assemblies 94', 94'' may be used, as shown respectively in FIGS. 20 and 21. The lock assembly 94' has a locking assembly 102 that is operated by a keyed mechanism 104. The state of the locking assembly 102 can be changed through a key to selectively allow installation and removal of the lock assembly 94'.

The lock assembly 94'' has a locking assembly 102', corresponding to the locking assembly 102, and additionally a combination mechanism 104' instead of the key mechanism 104. The combination mechanism 104' performs the same function as the keyed mechanism 104.

Figure 22:
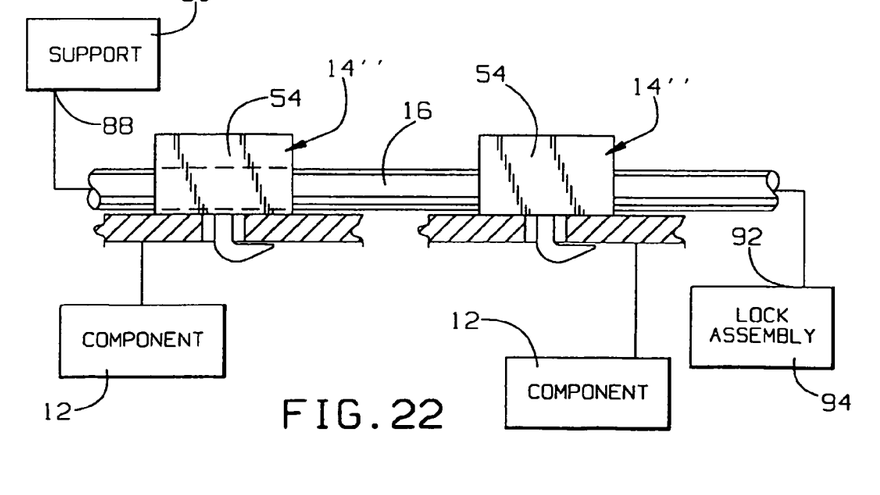
FIG. 22 is a view as in FIG. 18 wherein the cable is directed through multiple housings associated with separate components.

As shown in FIG. 22, the inventive concept can be used to simultaneously secure multiple, portable components 12. In this embodiment, the cable 16 is directed through exemplary housings 54, on the cable attaching assemblies 14''', associated one each with a separate component 12. The cable 16 can be directed through the housings 54 with the ends 88, 92 connected respectively to the support 90 and lock assembly 94, as hereinabove explained.

Figure 23:
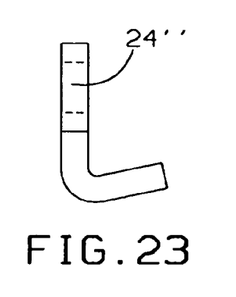
FIG. 23 is an elevation view of a further modified form of anchor element, according to the invention.

As an alternative to the sharply bent construction of the anchor elements 24, 24', described above, an anchor element 24'', as shown in FIG. 23, may be used. The anchor element 24'' has a curved, generally "J" or "V" shape that approximates the shape and function of the two distinct, transverse legs 26, 28; 26', 28', and is considered to be a functional equivalent thereto. The anchor element 24'' has corresponding first and operative positions and is angularly reoriented and translated to effect assembly thereof.

The foregoing disclosure of specific embodiments is intended to be illustrative of the broad concepts comprehended by the invention.

The invention claimed is:

1. In combination:
   a portable component having a wall with oppositely facing inside and outside surfaces and an opening through the wall;
   a cable attaching assembly,
   the cable attaching assembly comprising an anchor element with first and second transverse legs that have a fixed angular relationship,
   the first leg capable of being directed into the opening substantially along a first line in a first direction into a first position with the anchor element in a first orientation, the anchor element capable of being reoriented relative to the portable component from the first orientation with the anchor element in the first position to thereby place the anchor element in an operative position wherein the first leg is situated in a confronting relationship with the inside surface of the wall on the portable article wherein the first leg abuts to the inside surface to prevent separation of the anchor element by movement thereof in the operative position substantially along the first line opposite to the first direction; and a cable connected to the anchor element, the cable, cable attaching assembly and portable component configured so that the cable blocks movement of the anchor element so as to thereby prevent the anchor element from being reoriented from the operative position in a manner that allows the anchor element to be withdrawn from the opening through the wall of the portable component, the anchor element being the only component on the cable attaching assembly directed into the opening to maintain the first leg in the opening.

2. The combination according to claim 1 wherein the anchor element has a single piece that defines the first and second legs.

3. The combination according to claim 1 wherein the anchor element is formed by a single piece of metal that is bent to define the first and second legs.

4. In combination:

a portable component having a wall with oppositely facing inside and outside surfaces and an opening through the wall;

a cable attaching assembly, the cable attaching assembly comprising an anchor element with first and second transverse legs that have a fixed angular relationship, the first leg capable of being directed into the opening substantially along a first line in a first direction into a first position with the anchor element in a first orientation, the anchor element capable of being reoriented relative to the portable component from the first orientation with the anchor element in the first position to thereby place the anchor element in an operative position wherein the first leg is situated in a confronting relationship with the inside surface of the wall on the portable article wherein the first leg abuts to the inside surface to prevent separation of the anchor element by movement thereof in the operative position substantially along the first line opposite to the first direction; and a cable connected to the anchor element so that the anchor element cannot be reoriented from the operative position in a manner that allows the anchor element to be withdrawn from the opening through the wall of the portable component, the anchor element being the only component on the cable attaching assembly directed into the opening to maintain the first leg in the opening, wherein the cable attaching assembly further comprises a cover assembly, the cable capable of cooperating with the anchor element and cover assembly in a manner that a region of the wall of the portable component is captive between a part of the cover assembly and first leg, the part of the cover assembly and first leg cooperating with the wall on the portable component with the cover assembly in an operative state to prevent separation of the anchor element by reorientation of the anchor element from the operative position in a manner that would allow the anchor element to be withdrawn from the opening through the wall of the portable component.

5. The combination according to claim 4 wherein there are alignable openings in the second leg and cover assembly through which the cable extends to maintain the cover assembly in the operative state.

6. The combination according to claim 5 wherein the cover assembly has spaced walls between which the second leg resides with the cover assembly in the operative state and there is an opening in each of the spaced walls through which the cable extends.

7. The combination according to claim 6 wherein the cover assembly fully surrounds the second leg.

8. The combination according to claim 6 wherein the cover assembly has a single piece that defines the spaced walls.

9. The combination according to claim 1 wherein a free end of the cable is extended through the anchor element in a second direction and the cable attaching assembly further comprises a lock assembly that is releasably attached at the free end of the cable, the lock assembly precluding passage of the free end of the cable through the anchor element by movement thereof in a direction opposite to the second direction.

10. The combination according to claim 9 wherein the lock assembly comprises a housing and a locking assembly that is operable to selectively: a) maintain the housing on the cable with the locking assembly in a first state; and b) allow separation of the housing from the cable with the locking assembly in a second state.

11. The combination according to claim 10 wherein the locking assembly is changeable between the first and second states through one of: a) a key operated mechanism; and b) a combination operated mechanism.

12. In combination:

a portable component having a wall with oppositely facing inside and outside surfaces and an opening through the wall;

a cable attaching assembly, the cable attaching assembly comprising an anchor element with first and second transverse legs that have a fixed angular relationship, the first leg capable of being directed into the opening substantially along a first line in a first direction into a first position with the anchor element in a first orientation, the anchor element capable of being reoriented relative to the portable component from the first orientation with the anchor element in the first position to thereby place the anchor element in an operative position wherein the first leg is situated in a confronting relationship with the inside surface of the wall on the portable article wherein the first leg abuts to the inside surface to prevent separation of the anchor element by movement thereof in the operative position substantially along the first line opposite to the first direction; and a cable connected to the anchor element so that the anchor element cannot be reoriented from the operative position in a manner that allows the anchor element to be withdrawn from the opening through the wall of the portable component, the anchor element being the only component on the cable attaching assembly directed into the opening to maintain the first leg in the opening, wherein the cable attaching assembly further comprises a cover assembly, the cover assembly comprises a housing with a flat surface that faces the first leg with the anchor element in the operative position and the cover assembly in an operative state, wherein a region of the wall is captive between the flat surface and first leg in a manner that prevents separation of the anchor element by reorientation thereof from the operative position as would allow the anchor element to be withdrawn from the opening though the wall of the portable component.

13. The combination according to claim 1 wherein the opening is one of:

a) square; and b) rectangular with transverse dimensions that are not greater than 10 mm.

14. The combination according to claim 13 wherein the portable component is an electronic component.

15. The combination according to claim 1 further comprising a support to which the cable is secured to confine movement of the portable component relative to the support.

16. The combination according to claim 1 wherein the opening is round.

17. The combination according to claim 3 wherein the cover assembly comprises a housing with a U-shaped portion with first and second spaced legs between which the anchor element resides and an outturned flange on at least one of the spaced legs.

18. The combination according to claim 17 where there are oppositely projecting outturned flanges, one each on the first and second spaced legs.

19. The combination according to claim 17 wherein the U-shaped portion and at least one outturned flange are defined by a single piece of formed metal.

20. The combination according to claim 1 wherein the cable comprises a metal core and a non-metal sheath surrounding the metal core.

21. The combination according to claim 1 wherein the cable is extended through the anchor element so the wall is captive between the first leg and cable.

22. The combination according to claim 1 wherein the wall is captive between the first leg and cable.

\* \* \* \* \*